Aug. 21, 1928.  
C. HUNT  
1,681,856  
END GATE FASTENER  
Filed Feb. 3, 1926

Clarence Hunt, INVENTOR

BY Victor J. Evans

ATTORNEY

WITNESS: P. S. Hickey

Patented Aug. 21, 1928.

1,681,856

UNITED STATES PATENT OFFICE.

CLARENCE HUNT, OF CHURDAN, IOWA.

END-GATE FASTENER.

Application filed February 3, 1926. Serial No. 85,768.

This invention relates to improvements in latching mechanisms for the end gates of vehicles and has for an object the provision of means for quickly and securely latching a gate or similar member in closed position and for maintaining the mechanism in either latched or unlatched position until manually moved.

Another object of the invention is the provision of novel means for arranging the spring which yieldingly holds the mechanism in position, the construction and arrangement being such as to assist in the manual operation of the latching or unlatching movements, as well as to provide a handle for convenience of manipulation, and a housing for the spring.

With the above and other objects in view, the invention further includes the following novel features and details of construction, to be hereinafter more fully described, illustrated in the accompanying drawings and pointed out in the appended claim.

In the drawings:

Figure 2 is an enlarged fragmentary sectional view showing by dotted lines the handle of the latch swung outward.

Figure 3 is an enlarged fragmentary sectional view taken substantially on the line 3—3 of Figure 1.

Figure 4 is a fragmentary section on the line 4—4 of Figure 1.

Figure 1:
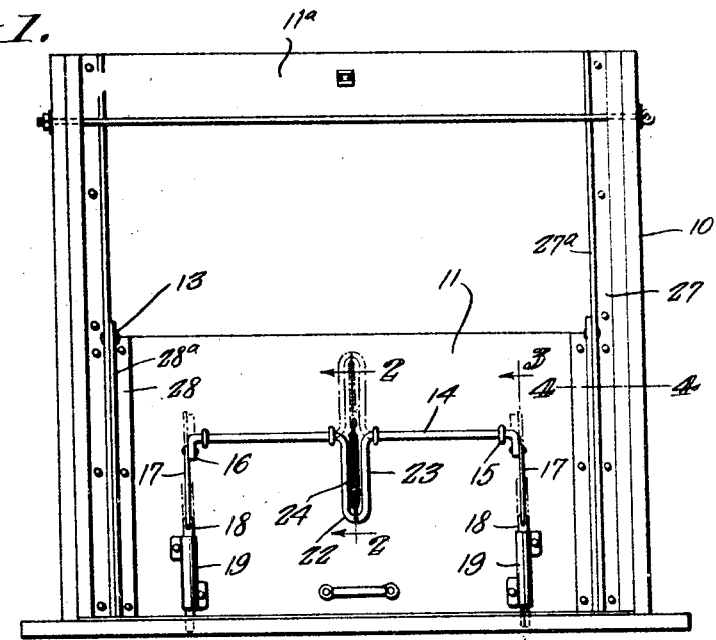
Figure 1 is a rear elevation showing a box or body of a wagon or vehicle with the invention applied.
Figure 1:
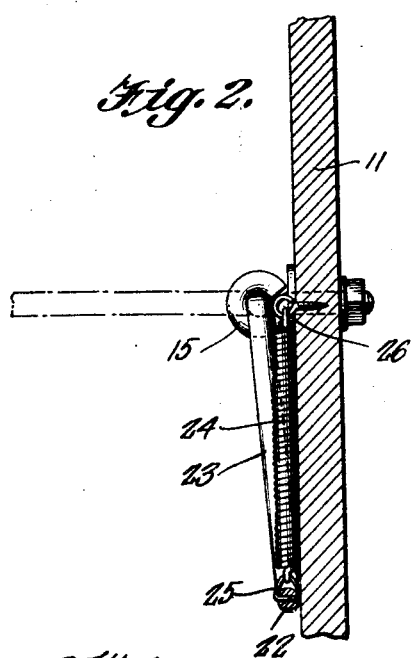
Figure 1:
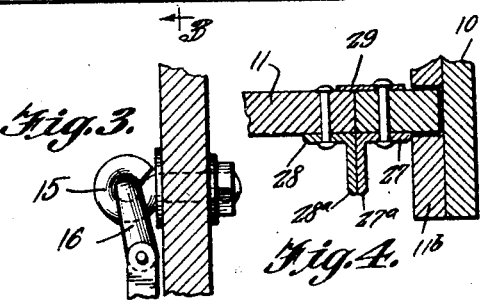
Figure 1:
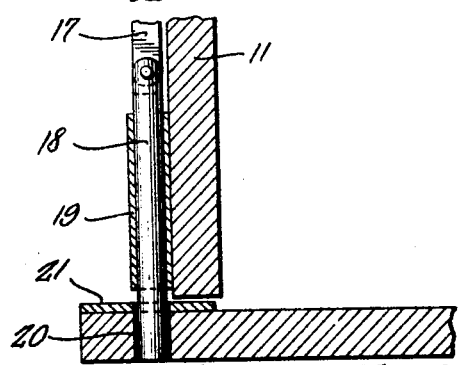

Referring to the drawings in detail wherein like characters of reference denote corresponding parts, the reference character 10 indicates the box or body of a wagon or like vehicle, while 11 indicates the end gate which is hingedly secured in place as shown at 13.

The invention which is designed to latch the gate in closed position includes a rock shaft 14 which is mounted in suitable bearings 15 carried by the end gate. The opposite ends of the shaft 14 are provided with crank arms 16 and these arms have pivotal connection with the upper ends of links 17. The lower ends of these links are pivotally connected to latching bolts 18 and the latter are slidingly mounted in suitable guides 19 secured to the end gate. The bolts 18 are adapted to engage the box or body of the vehicle and for this purpose there are provided openings 20 which receive the bolts, the latter also passing through openings provided in a wear plate 21 which extends horizontally across the rear of the vehicle. A keeper is thus provided for engagement by the bolts. Any suitable type of bushings or sockets may be positioned to receive the bolts.

The shaft 14 is provided substantially central of its length with a combined crank arm and handle 22. This crank arm and handle includes spaced substantially parallel arms 23. A spring 24 is located between these arms and has one of its ends connected to the outer end of the crank arm as shown at 25, while its other inner end is connected to the end gate at a point to one side of and substantially central of the length of the shaft 14 as shown at 26. The inner connected end of the spring is thus offset with respect to the longitudinal center of the shaft 14 so that when the latch bolts are engaged in their keepers, the crank arm or handle 22 will be arranged as shown in full lines in Figures 1 and 2 of the drawings so that the action of the spring will be to hold the outer end of the crank arm or handle against the end gate. In releasing the end gate, the bolts 18 are retracted by moving the handle or crank arm outward and when the latter passes outward beyond the horizontal position shown by the dotted lines in Figure 2, the tendency of the spring 24 will be to draw the crank arm inward and upward and to yieldingly hold it in this position. The bolts will thus remain in their retracted position until manually moved.

In addition to the advantages mentioned, the particular position and arrangement of the spring 24 houses the spring between the parallel arms 23 so as to afford protection for the spring.

It is one of the purposes of the present invention to so mount the gate that the bolts 18 will register with the keeper openings when the gate is closed. For this purpose there is secured to the end of the wagon box or body, angle irons 25. These irons are arranged to provide parallel rearwardly extending flanges 26, which are arranged along the opposite side edges of the opening covered by the end gate.

The end gate 11 includes a relatively stationary section 11$^a$ to which the movable section of the gate is hinged and this relatively stationary section 11$^a$ is removably positioned between strips 11$^b$ secured to the body or box. Secured to the section 11$^a$ near the opposite side edges thereof are angle irons 27. These irons are arranged to provide parallel rearwardly extending flanges 27ª which are disposed along the opposite side edges of the opening covered by the hinged section of the gate.

Secured along opposite side edges of the hinged section of the gate are angle irons 28 which also provide rearwardly extending flanges 28ª as shown in Figures 1 and 4 of the drawings. The flanges 27ª and 28ª are connected by hinge pins 13. The angle irons 27, in addition to providing means for hingedly connecting the hinged section of the gate 11, reinforce the body. They also act as guides to properly position the gate so that the bolts 18 will readily enter the keeper openings. They further act to prevent play of the hinged section of the gate transversely of the wagon body. The section 11ª of the gate is provided along opposite edges of the opening with strips 29 which extend beyond the edges of the opening and provide stops to limit inward movement of the hinged section.

The invention is susceptible of various changes in its form, proportions and minor details of construction and the right is herein reserved to make such changes as properly fall within the scope of the appended claim.

Having described the invention what is claimed is:—

A latch mechanism for end gates comprising a pair of spaced tubular guides secured to said gate, a pair of latch bolts slidably mounted in said guides, stationary means for engagement by said bolts when the latter are in latching position, a rock shaft mounted on the gate and arranged transversely thereof, the opposed ends of said shaft being offset, links pivotally connected with the offset extremities of the shaft and the adjacent ends of said bolts, the intermediate portion of said shaft being extended to provide a handle including spaced parallel limbs, whereby said shaft may be rocked to move said bolts into active or inactive positions, a coil spring arranged between the limbs of said handle and substantially coextensive in length therewith, one end of the spring being secured to the adjacent end of the handle, and the other end secured to the gate, with said spring arranged at an angle with relation to said handle, and adapted to maintain said bolts in either latched or unlatched position.

In testimony whereof I affix my signature.

CLARENCE HUNT.